United States Patent
Lerner et al.

(10) Patent No.: US 7,396,131 B2
(45) Date of Patent: Jul. 8, 2008

(54) PROJECTION ASSEMBLY

(75) Inventors: Scott Lerner, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 11/255,612

(22) Filed: Oct. 20, 2005

(65) Prior Publication Data
US 2007/0091272 A1    Apr. 26, 2007

(51) Int. Cl.
G03B 21/26    (2006.01)
G03B 21/28    (2006.01)
H04N 5/74     (2006.01)
G02F 1/1335   (2006.01)
G02B 27/14    (2006.01)

(52) U.S. Cl. ............................. 353/31; 353/34; 353/37; 353/82; 353/84; 353/94; 353/99; 348/750; 348/757; 348/758; 349/8; 359/634

(58) Field of Classification Search ................... 353/30, 353/31, 34, 37, 81, 82, 94, 98, 99, 102, 84; 348/739, 744, 750, 757–759; 349/5, 7, 8; 359/618, 629, 634, 638–640; 345/1.1, 1.2, 345/1.3, 3.1, 33, 38, 50
See application file for complete search history.

(56) References Cited

U.S. PATENT DOCUMENTS

| 7,188,953 | B2 * | 3/2007 | Silverstein et al. ............ 353/20 |
| 2002/0191154 | A1 | 12/2002 | Shahzad et al. |
| 2004/0080938 | A1 | 4/2004 | Holman et al. |
| 2004/0109139 | A1 * | 6/2004 | Kiser et al. ................... 353/31 |
| 2004/0165152 | A1 | 8/2004 | Ito et al. |
| 2005/0030272 | A1 | 2/2005 | Hosaka |
| 2006/0187414 | A1 * | 8/2006 | Bell et al. ..................... 353/31 |

\* cited by examiner

*Primary Examiner*—Rochelle-Ann Blackman

(57) ABSTRACT

Projection assemblies are provided herein for use in a display system. According to one exemplary embodiment, the projection assembly includes an illumination source and a plurality of co-planar modulator panels. A method of modulating light is also provided herein that includes generating multi-component light, splitting the multi-component light into a plurality of component beams, and modulating the component beams with a plurality of co-planar modulator panels to form a plurality of sub-images.

22 Claims, 6 Drawing Sheets

PROJECTION ASSEMBLY

BACKGROUND

A conventional system or device for displaying an image, such as a display, projector, or other imaging system, is frequently used to display a still or video image. Viewers evaluate display systems based on many criteria such as image size, contrast ratio, color purity, brightness, pixel color accuracy, and resolution. Image brightness, pixel color accuracy, and resolution are particularly important metrics in many display markets because the available brightness, pixel color accuracy, and resolution can limit the size of a displayed image and control how well the image can be seen in venues having high levels of ambient light.

Many digital display systems create a full-color display with a light modulator by creating three or more modulated images in primary colors (red, green, and blue) per video frame. The primary colors are typically derived from a white light source using a color wheel, prism, or some other color filter. The modulated images are sequentially displayed at a high rate so as to create a full-color image in the human visual system. Thus, this method of generating a full-color display is called "sequential color." Although the use of sequential color yields the desired red, green, and blue light for image formation, it does so by blocking the transmission of undesired light wavelengths.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

DETAILED DESCRIPTION

A projection assembly is provided herein for use with projection assemblies and display systems such as televisions, projectors, etc. According to an exemplary embodiment, the projection assembly includes a plurality of co-planar modulator panels. The co-planar modulator panels allow for independent control of the output of each of the light modulator panels. For example, each modulator panel may be of a different type, size, and/or resolution depending on the desired output of the projection assembly. Further, the focus and magnification of the output of each of the modulator panels may be independently controlled.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. Although the phrase "in one embodiment" appears in various places in the specification, each appearance of the phrase does not necessarily to the same embodiment.

Display System

Figure 1:
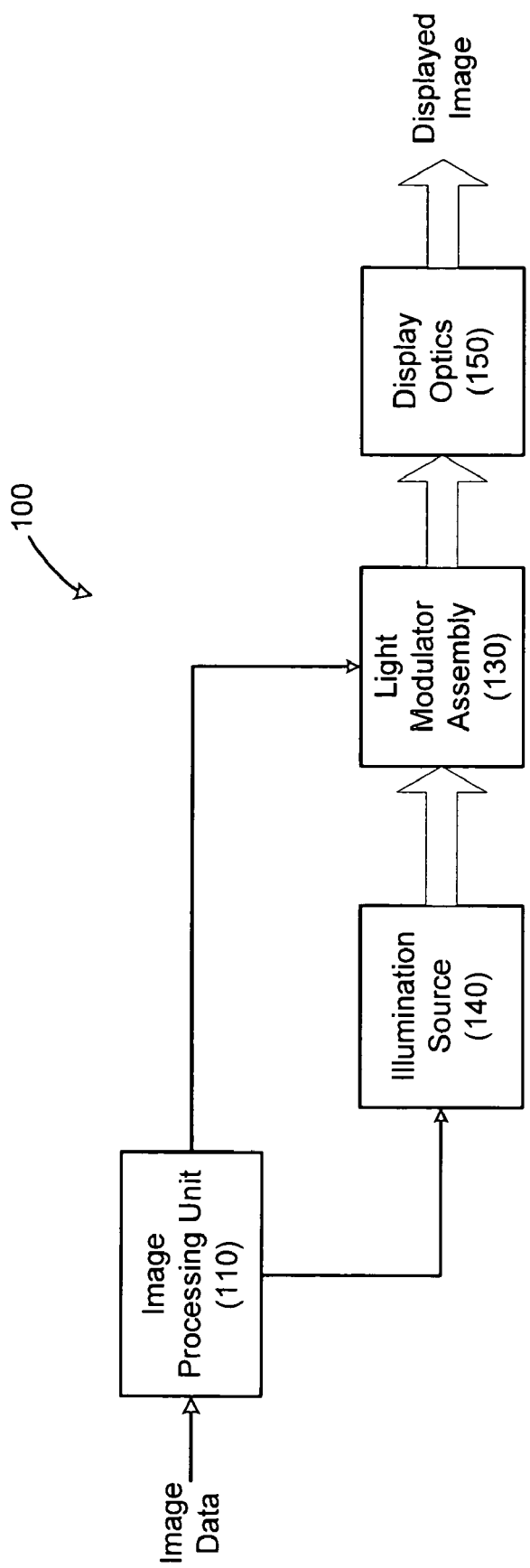
FIG. 1 illustrates a display system according to one exemplary embodiment.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100).

While one image is illustrated and described as being processed by the image processing unit (110), it will be understood by one skilled in the art that a plurality or series of images may be processed by the image processing unit (110). The image processing unit (110) performs various functions including controlling a light modulator assembly (130).

The display system (100) also includes an illumination source (140). The illumination source (140) generates multi-component light. For ease of reference, the illumination source (140) and the light modulator assembly (130) will be referred to as a projection assembly. The multi-component light produced by the illumination source (140) is split into individual components, such as red, green, and blue components.

These components are then directed to the light modulator assembly (130). The light modulator assembly (130) includes a plurality of individual light modulator panels. The individual components directed to the light modulator assembly (130) are directed to corresponding modulator panels. The light modulator panels are arranged in a co-planar configuration. In particular, according to one exemplary embodiment, the light modulator includes a plurality of generally planar light modulator panels. According to such an exemplary embodiment, a single plane may be defined which contains a substantial portion of each of the light modulator panels, such that the light modulator panels are substantially coplanar.

The incident light on each of the light modulator panels may be modulated in its frequency, phase, intensity, polarization, or direction by the modulator panels. Each modulator panel forms a single sub-image. For example, as previously introduced, the plurality of light modulator panels may include red, green, and blue light modulator panels that have corresponding light directed thereto. According to such an embodiment, the light modulator panel then modulates the light incident thereon to form red, green, and blue sub-images. These individual sub-images are then directed to display optics (150).

The display optics (150) may include any device configured to display or project an image. For example, according to one exemplary embodiment, the display optics (150) include, but are not limited to, a lens assembly that includes a plurality of lenses in optical communication with each of the light modulator panels. The lens assembly is configured to combine, project, and focus the individual sub-images to form a single full-color image and to display the full-color image onto a viewing surface. The viewing surface may be, but is not limited to, a screen, a television such as a rear projection-type television; a wall, a liquid crystal display (LCD), or a computer monitor.

Method of Modulating Light

Figure 2:
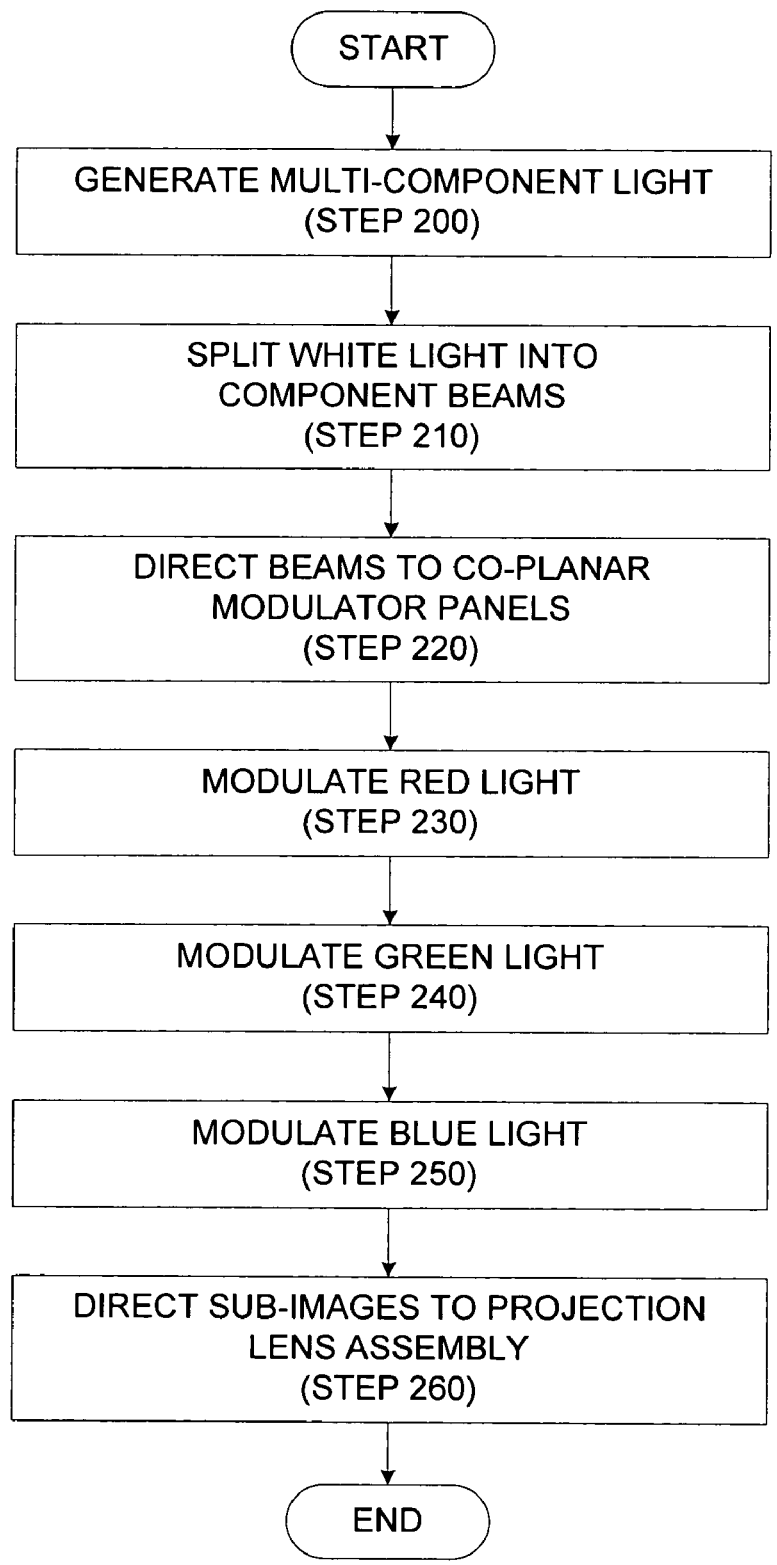
FIG. 2 is a flowchart illustrating a method of modulating light according to one exemplary embodiment.

FIG. 2 illustrates a method of modulating light. The method begins by generating multi-component light (step 200). The multi-component light may be generated by any suitable light source module, such as a xenon gas or mercury arc bulb coupled to a reflector.

Light produced by the light source module is then split into a plurality of component beams (step 210). According to one exemplary method the component beams include red, green, and blue component beams. The component beams may be split in any suitable way. For example, dichroic mirrors or filters may be used to split the multi-component light. In particular, the light may be split first into a first component beam and an intermediate beam, and then the intermediate beam may be further split into second and third component beams. As the multi-component light is split into individual component beams, each individual component beam is directed to a corresponding co-planar modulator panel (step 220).

Each component beam is then modulated by an associated modulator. For example, according to the present exemplary process, red light is modulated by the red modulator (step 230), the green light is modulated by the green modulator (step 240), and the blue light is modulated by the blue modulator (step 250). These steps occur substantially simultaneously such that the light modulated by each modulator panel corresponds to one part, or sub-image, of a single image or series of images. In particular, the modulator panels are configured to modulate light in response to data from an image processing unit. The data sent to each modulator panel corresponds to the formation of a sub-image. Each modulator may be a reflective- and/or an interference-type light modulator that modulates the light in response to the data to form the sub-images.

Modulating the green light (step 240) may include forming a green sub-image with a resolution higher than that produced by modulating the red light (step 230) and/or the blue light (step 250). In general, the eye is less sensitive to red and blue light. As such, the red and blue light may be modulated at a lower resolution while minimizing or eliminating any perceived decrease in resolution.

Further, as introduced, these steps occur in modulators that are substantially planar. In particular, generally planar modulator panels will be discussed. Thus, the co-planar modulator panels substantially lie in a single plane. For example, according to one exemplary embodiment, the modulator panels may be formed on a single substrate. According to another exemplary embodiment, the modulator panels are formed on separate substrates. The separate substrates are then aligned and positioned such that the modulator panels are co-planar. The substrates may then be placed on a single surface. After the component beams have been modulated, they are directed to a projection lens assembly (step 260), which directs the sub-images to a display surface. One exemplary projection assembly will be discussed in more detail below.

Exemplary Projection Assembly

Figure 3:
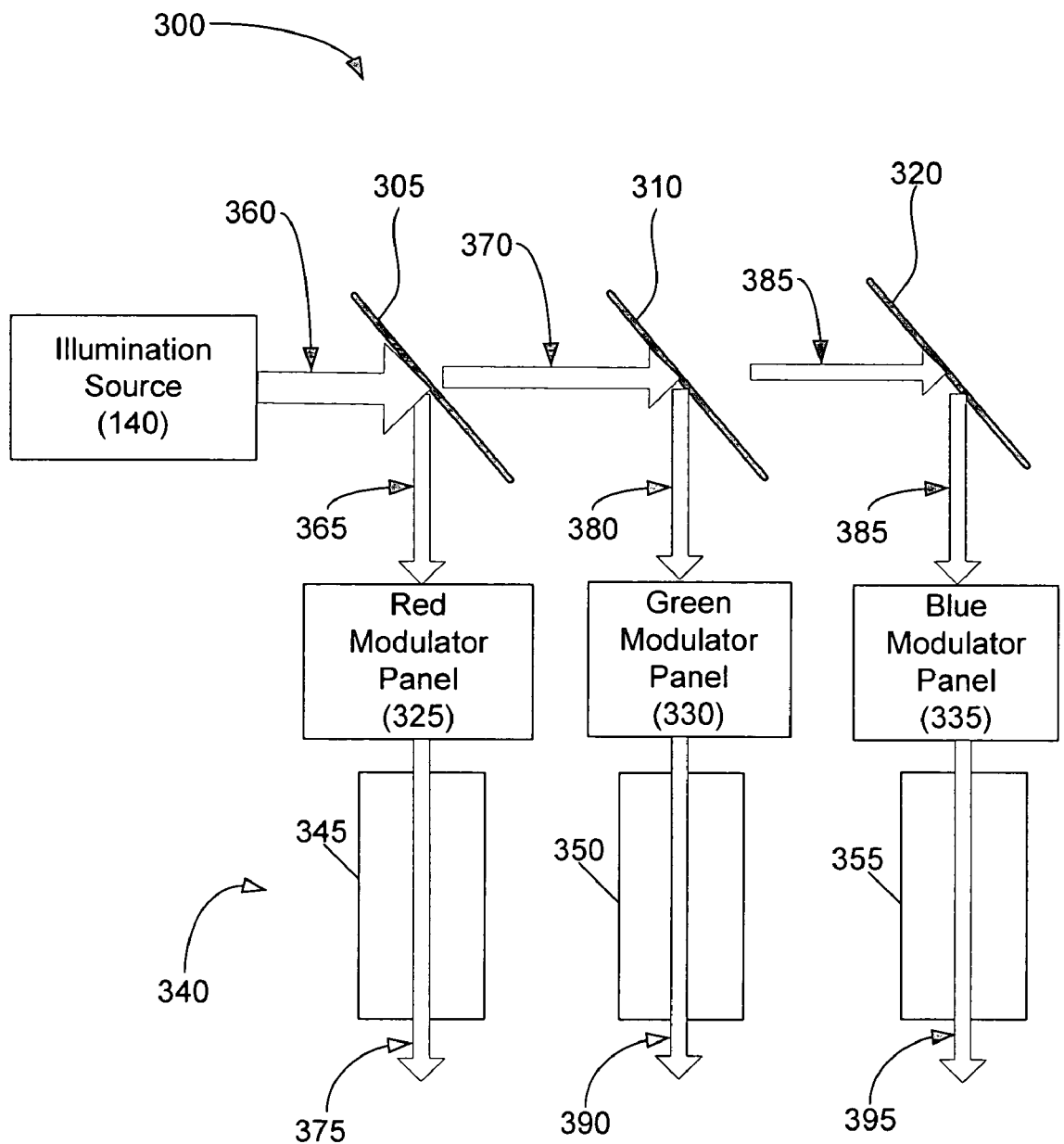
FIG. 3 illustrates a projection assembly according to one exemplary embodiment.

FIG. 3 is a schematic view of an exemplary projection assembly (300). As shown in FIG. 3, the projection assembly (300) generally includes a plurality of dichroic mirrors (305, 310), an illumination source (140), a turning mirror (320), a plurality of light modulator panels, such as a red light modulator panel (325), a green light modulator panel (330), and a blue modulator panel (335), and a projection lens assembly (340). According to the present exemplary embodiment, the projection lens assembly (340) includes a plurality of projection lenses, such as a red projection lens (345), a green projection lens (350), and a blue projection lens (355).

As previously discussed, the illumination source (140) generates multi-component light (360). The multi-component light (360) is incident first on the first dichroic mirror (305). For example, the first dichroic mirror (305) is oriented such that the multi-component light (360) strikes the first dichroic mirror (305) with an angle of incidence of approximately 45 degrees. According to the present exemplary embodiment, the first dichroic mirror (305) is a red/green dichroic mirror. The orientation and configuration of the first dichroic mirror (305) is such that the red/green dichroic mirror splits the multi-component light (360) by reflecting the red component beam (365) and transmitting the blue/green component beam (370).

The red component beam (365) is directed to the red modulator panel (325). The red modulator panel (325) modulates the red component beam (365) to form a red sub-image (375). For ease of reference, the operation of each of the modulator panels, including the red modulator panel (325), will be discussed with reference to a reflective-type light modulator panel. Each modulator panel includes an array of individual pixels. Each pixel includes a reflective plate that is selectively tilted. According to one exemplary embodiment, when a pixel is ON, light incident thereon is directed toward the corresponding projection lens, such as the red projection lens (345). The light directed to the projection lens and intended to be displayed on the display surface may be referred to as display light.

Similarly, according to the present method, when a pixel is OFF, light incident thereon is directed away from the projection lens. The light directed away from the projection lenses may be referred to as non-display light. The non-display light is directed to a beam dump or other device configured to minimize the amount of non-display light that reaches the display surface. For example, according to one exemplary embodiment the beam dump includes surfaces treated with material to absorb a substantial portion of the non-display light. The non-display light may be directed from the modulator panels (325, 330, 335) by any suitable device. Such devices may include, without limitation, a total internal refection (TIR) prism, a cross TIR prism, and/or spatial separation of the non-display light from the display light. Accordingly, light directed to each reflective modulator panel is separated into display light and non-display light to selectively form a sub-image.

Returning to the operation of the red modulator panel (325), the red light modulator panel (325) directs the red sub-image (375) to the red projection lens (345). The red projection lens (345) according to the present exemplary embodiment directs the red sub-image (375) to a display surface. As will be discussed in more detail below, the red sub-image (375) is combined with the output of the green and blue light modulator panels (330, 335) to form a single full-color image. Further, as will be discussed in more detail, the co-planar configuration of the projection assembly (300) may allow for looser requirements for the red and blue light modulator panels (325, 335).

Returning to the multi-component light (360), as previously discussed the red component beam (365) is reflected while the blue/green beam (370) is transmitted. The blue/green beam (370) is incident on the second dichroic mirror (310). According to the present exemplary embodiment, the second dichroic mirror (310) is a blue/green dichroic mirror oriented at approximately 45 degrees relative to path of the blue/green beam (370). Such a configuration and orientation causes the second dichroic mirror (310) to reflect a green component beam (380) and transmit a blue component beam (385).

The green component beam (380) is directed to the green modulator panel (330). The green modulator panel (330) modulates the green component beam (380) to form a green sub-image (390). The blue component beam (385) is incident on the turning mirror (320), which directs the blue component beam (385) to the blue modulator panel (335). The blue modulator panel (335) modulates the blue component beam (385) to form a blue sub-image (395).

The red, green, and blue sub-images (375, 390, 395) are then directed to a display surface to form a single full-color image. In particular, according to one exemplary embodiment, the projection assembly (340) directs the red, green, and blue sub-images (375, 390, 395) directly to the display surface. As a result, the red, green, and blue sub-images (375, 390, 395) are combined at the display surface.

As introduced, the light modulator panels (325, 330, 335) are substantially co-planar. Further, according to the present exemplary embodiment, the output of each of the light modulator panels (325, 330, 335) is combined at the display surface. It may be desirable to independently vary several factors in order to optimize the image produced. For example, each of the first order properties, e.g. focal length, magnification, etc., of each projection lens (345, 350, 355) may be varied to optimize the resulting image. Further, the projection lenses (345, 350, 355) may also be offset and/or tilted with respect to the modulator panels. In addition, keystone and other distortion of the red and blue sub-images (375, 395) can be corrected electronically or by another means, as is well known in art.

Additionally, the green modulator panel (330) may be of a different size than the red and blue modulator panels (325, 335). As introduced, the eye is less sensitive to red and blue light. As such, the resolution of the red modulator panel (325) and/or blue modulator panel (335) may be reduced while minimizing or eliminating any perceived decrease in resolution. Thus, the red and blue modulator panels (325, 335) may have differing resolutions relative to each other and to the green modulator panel (330).

For example, each modulator panel may have a different size. The relative size of each of the light modulator panels may be selected according to several factors. These factors include, without limitation, desired color gamut, desired efficiency, and etendue match between the illumination source (140) and the light modulator panels (325, 330, 335). Accordingly, the co-planar modulator panels may be sized as desired. Additionally, as introduced, the projection lens assembly (340) may also be configured as desired.

Figure 4:
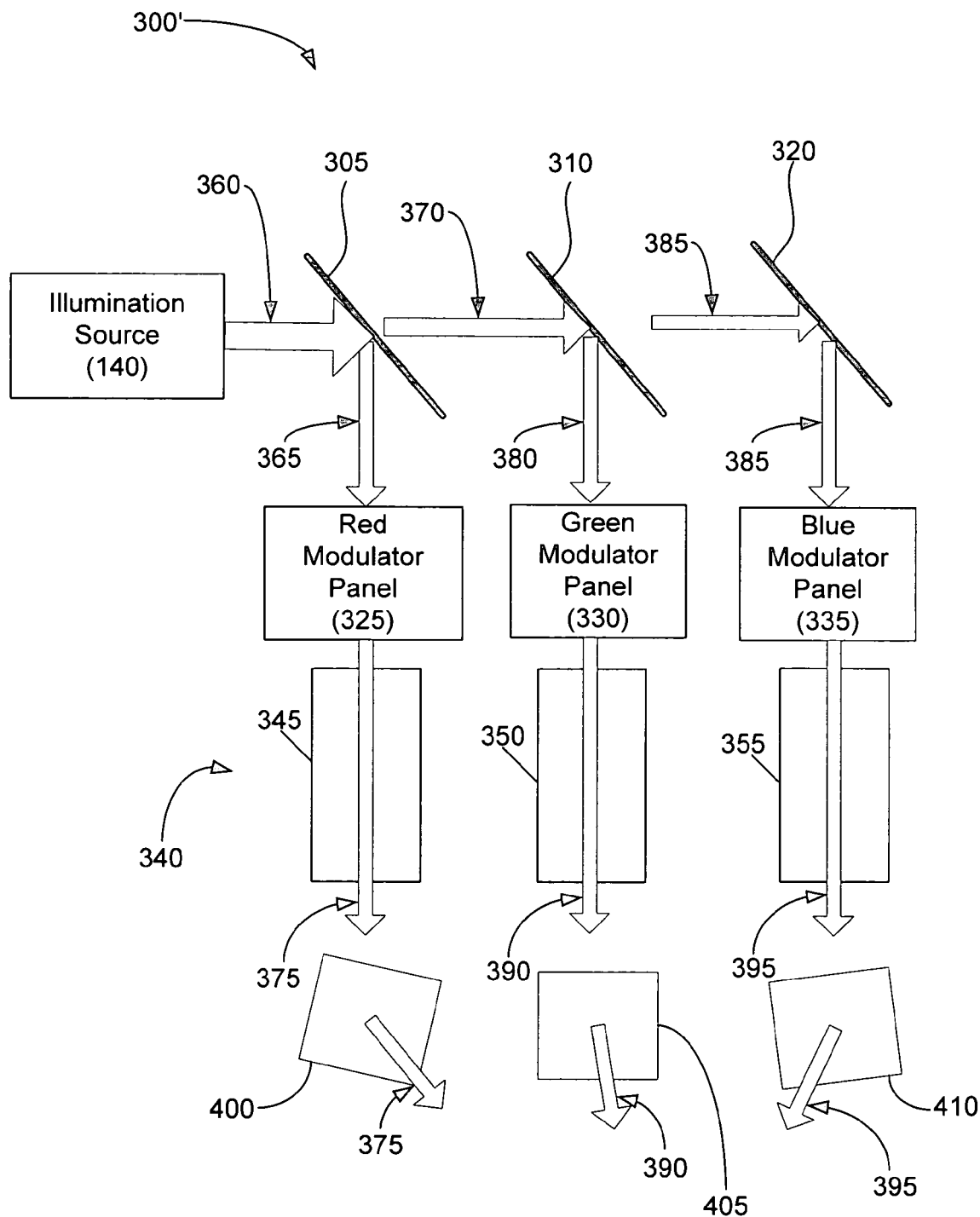
FIG. 4 illustrates a projection assembly according to one exemplary embodiment.

For example, FIG. 4 illustrates a projection assembly (300') wherein each projection lens (345, 350, 355) includes projection turning mirrors (400, 405, 410) associated therewith. Light from the illumination source (140) is directed to the red, blue, and green modulator panels (325, 330, 335) and modulated as previously discussed. The red, green, and blue sub-images (375, 390, 395) are then directed to the corresponding projection turning mirrors (400, 405, 410). The projection turning mirrors (400, 405, 410) direct the sub-images (375, 390, 395) to the display surface, where they are combined. The sub-image images (375, 390, 395) may also be combined before they reach the display surface.

Figure 5:
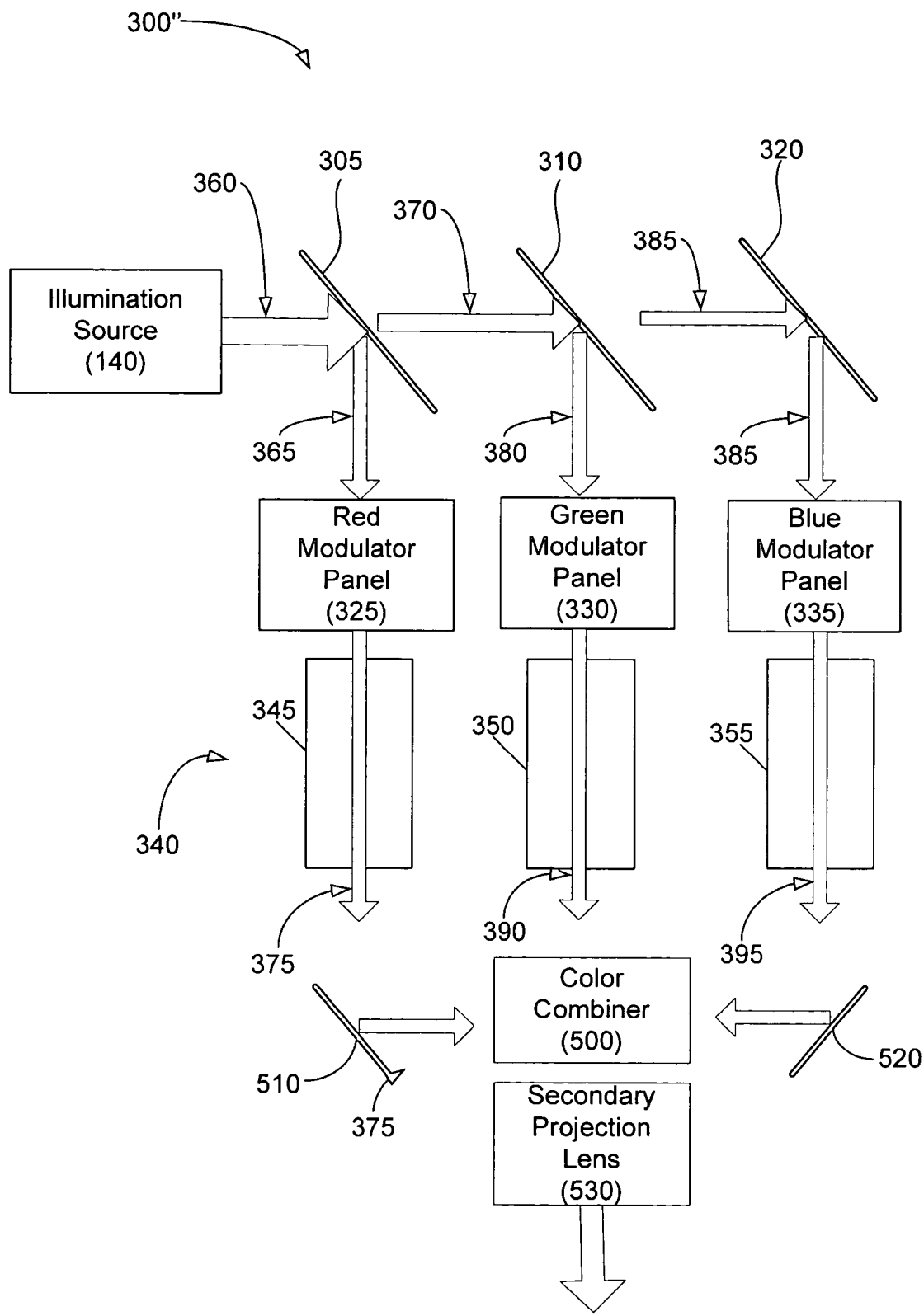
FIG. 5 illustrates a projection assembly according to one exemplary embodiment.

For example, FIG. 5 illustrates a projection assembly (300") that includes a color combiner (500). The red and blue sub-images (375, 395) are directed to the color combiner (500) by turning mirrors (510, 520) while the green sub-image (390) is directed to the color combiner (500) from the green projection lens (350). The color combiner (500) combines the sub-images (375, 390, 395) to produce a single full-color beam. The color combiner (500) may be of any suitable type, including, without limitation, trichroic prism, or dichroic x cube. The full-color beam combined by the color combiner (500) is directed to a secondary projection lens (530). The secondary projection lens (530) directs the combined light to the display surface.

Figure 6:
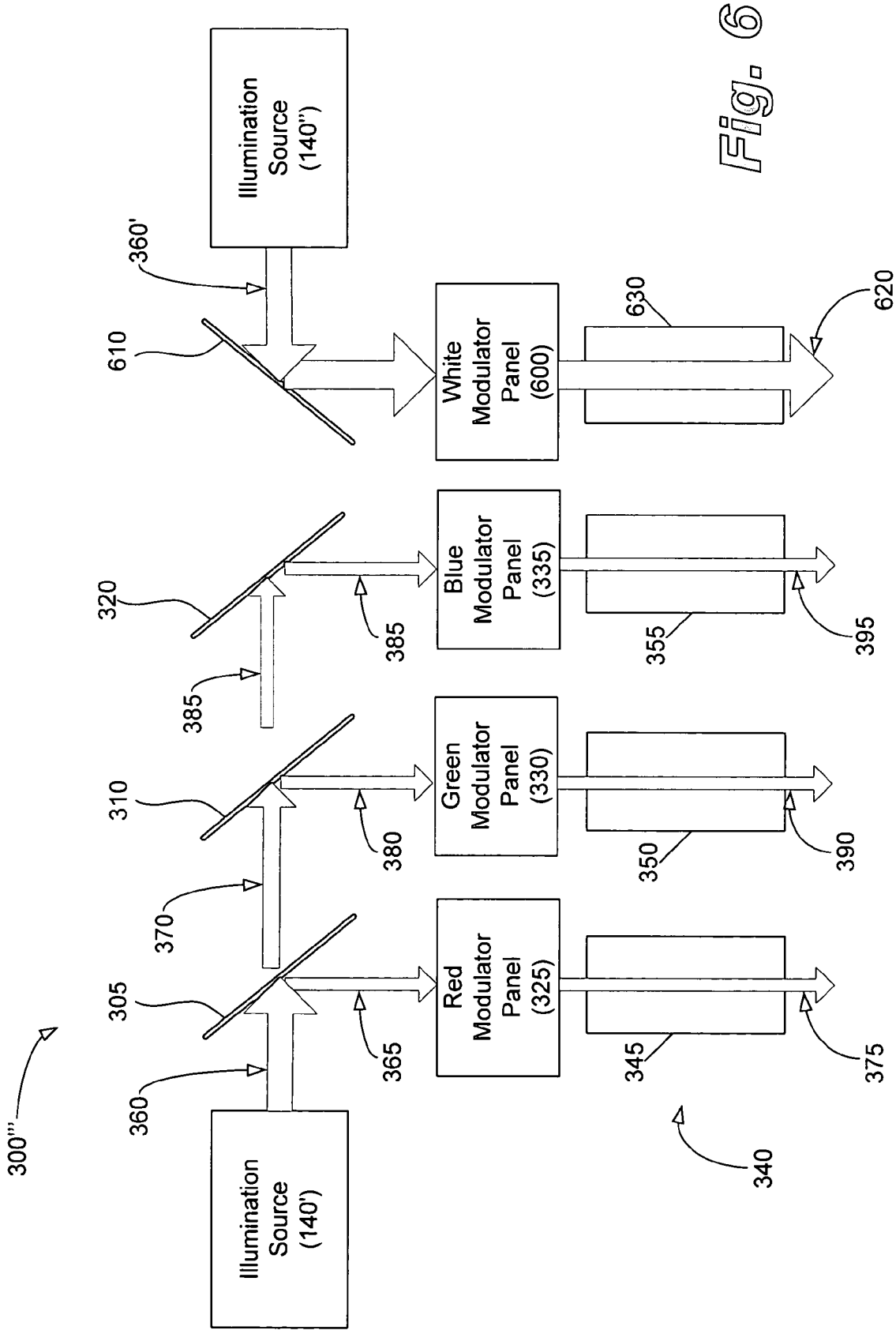
FIG. 6 illustrates a projection assembly according to one exemplary embodiment Throughout the drawings, identical reference numbers designate similar, but not necessarily identical, elements.

Several configurations have been discussed thus far which include a single illumination source. As shown in FIG. 6, any number of illumination sources and/or light modulator panels may be used. FIG. 6 illustrates a projection assembly (300''') that includes multiple illumination sources. The multiple illumination sources according to the present exemplary embodiment include first and second illumination sources (140', 140"). The projection assembly (300''')includes red, green, and blue modulator panels (325, 330, 335). The red, green, and blue modulator panels (325, 330, 335) modulate light produced by the first illumination source (140'), as previously discussed.

The projection assembly (300''') also includes a white modulator panel (600). The white modulator panel (600), according to the present exemplary embodiment, is substantially coplanar with the red, green, and blue modulator panels (325, 330, 335). The second illumination source (140") produces a second multi-component beam (360'). The second multi-component beam (360') is directed to a second turning mirror (610).

The second turning mirror (610) is oriented and positioned to direct the second component beam (360') to the white modulator panel (600). The white modulator panel (600) then modulates the second multi-component beam (360') to form a supplementary image beam (620). The supplementary image beam (620) is directed through a fourth projection lens, such as a white projection lens (630) to the display surface. The supplementary image beam (620) increases the brightness of the full-color image produced by the red, green, and blue modulator panels (325, 330, 335).

A projection assembly is provided herein for use with projection assemblies and display systems such as televisions, projectors, etc. According to an exemplary embodiment, the projection assembly includes a plurality of co-planar modulator panels. The co-planar modulator panels allow for independent control of the output of each of the light modulator panels. For example, each modulator panel may be of a different size, depending on the desired output of the projection assembly. Further, the focus and magnification of the output of each of the modulator panels may be independently controlled.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection assembly, comprising:
   an illumination source configured to provide multi-color component light;
   color separation optics optically coupled to said illumination source that are configured to divide said multi-color component light into beams of different color components;
   a plurality of co-planar modulator panels each configured to respectively receive a said beam of a particular color component and modulate that beam; and a plurality of projection lens systems, each optically coupled to a respective modulator panel, wherein each of said projection lens systems differs in at least one first order property depending on a color of a said beam modulated by a corresponding modulator panel.

2. The projection assembly of claim 1, wherein said first order property comprises either focal length or magnification.

3. The projection assembly of claim 1, wherein said co-planar modulator panels include red, green, and blue modulator panels; and wherein said green modulator panel is of higher resolution than said red and blue modulator panels.

4. The projection assembly of claim 3, wherein said green modulator panel is larger than said red and blue modulator panels.

5. The projection assembly of claim 1, wherein said projection lens systems are angled with respect to each other such that projection beams of different color components from said projection lens systems are combined for display.

6. The projection assembly of claim 1, wherein said color separation optics comprise at least one dichroic mirror between said illumination source and said plurality of co-planar modulator panels.

7. The projection assembly of claim 1, wherein each of said projection lens systems is optically coupled to one of a respective plurality of turning mirrors, wherein said turning mirrors are angled with respect to each other such that projection beams of different color components from said projection lens systems are combined for display.

8. The projection assembly of claim 1, and further comprising a color combiner in optical communication with said projection lenses.

9. The projection assembly of claim 1, and further comprising a second illumination source and a white modulator panel coplanar to said plurality of coplanar modulator panels.

10. The projection assembly of claim 1, wherein each of said projection lens systems is offset with respect to a corresponding modulator panel.

11. A display system, comprising:
an image processing unit;
at least one illumination source configured to provide multi-color component light;
color separation optics optically coupled to said illumination source that are configured to divide said multi-color component light into beams of different color components;
a plurality of co-planar modulator panels in optical communication with said illumination source, wherein each is configured to respectively receive a said beam of a particular color component and modulate that beam; and
display optics in optical communication with said co-planar modulator panels;

wherein said display optics comprise a plurality of projection lens systems, each optically coupled to a respective modulator panel, wherein each of said projection lens systems differs in at least one first order property depending on a color of a said beam modulated by a corresponding modulator panel, and wherein said first order property comprises either focal length or magnification.

12. The display system of claim 11, wherein said modulator panels comprise reflective modulator panels.

13. The system of claim 11, wherein said modulator panels comprise red, green, and blue modulator panels.

14. The system of claim 13, wherein said green modulator panel is of a higher resolution than said red and blue modulator panels.

15. The system of claim 13, and further comprising a second illumination source and white modulator panel, said white modulator panel being substantially coplanar with said modulator pane.

16. A method of modulating light, comprising:
generating multi-component light;
splitting said multi-component light into a plurality of component beams of different colors;
modulating said component beams with a plurality of co-planar modulator panels to form a plurality of sub-images;
projecting each modulated component beam with a different corresponding projection lens system; and
configuring each of said projection lens systems to differ in at least one first order property depending on a color of a corresponding modulated component beam.

17. The method of claim 16, further comprising angling said projection lens systems for combining said sub-images to form a full-color image.

18. The method of claim 17, wherein combining said sub-images includes combining said sub-images on a display surface.

19. The method of claim 17, wherein combining said sub-images includes combining said sub-images with a color combiner.

20. The method of claim 16, wherein forming said plurality of sub-images includes forming red, green, and blue sub-images.

21. The method of claim 16, wherein forming said plurality of sub-images further includes forming a white sub-image.

22. The method of claim 16, wherein forming said plurality of sub-images includes forming a green sub-image with a resolution higher than resolutions of said red and blue sub-images.

* * * * *

UNITED STATES PATENT AND TRADEMARK OFFICE
CERTIFICATE OF CORRECTION

| | | |
|---|---|---|
| PATENT NO. | : 7,396,131 B2 | Page 1 of 1 |
| APPLICATION NO. | : 11/255612 | |
| DATED | : July 8, 2008 | |
| INVENTOR(S) | : Scott Lerner et al. | |

It is certified that error appears in the above-identified patent and that said Letters Patent is hereby corrected as shown below:

In column 5, line 61, delete "sub-image images" and insert -- sub-images --, therefor.

In column 8, line 20, in Claim 15, delete "pane." and insert -- panel. --, therefor.

Signed and Sealed this

Second Day of December, 2008

JON W. DUDAS
*Director of the United States Patent and Trademark Office*